Figure 1:
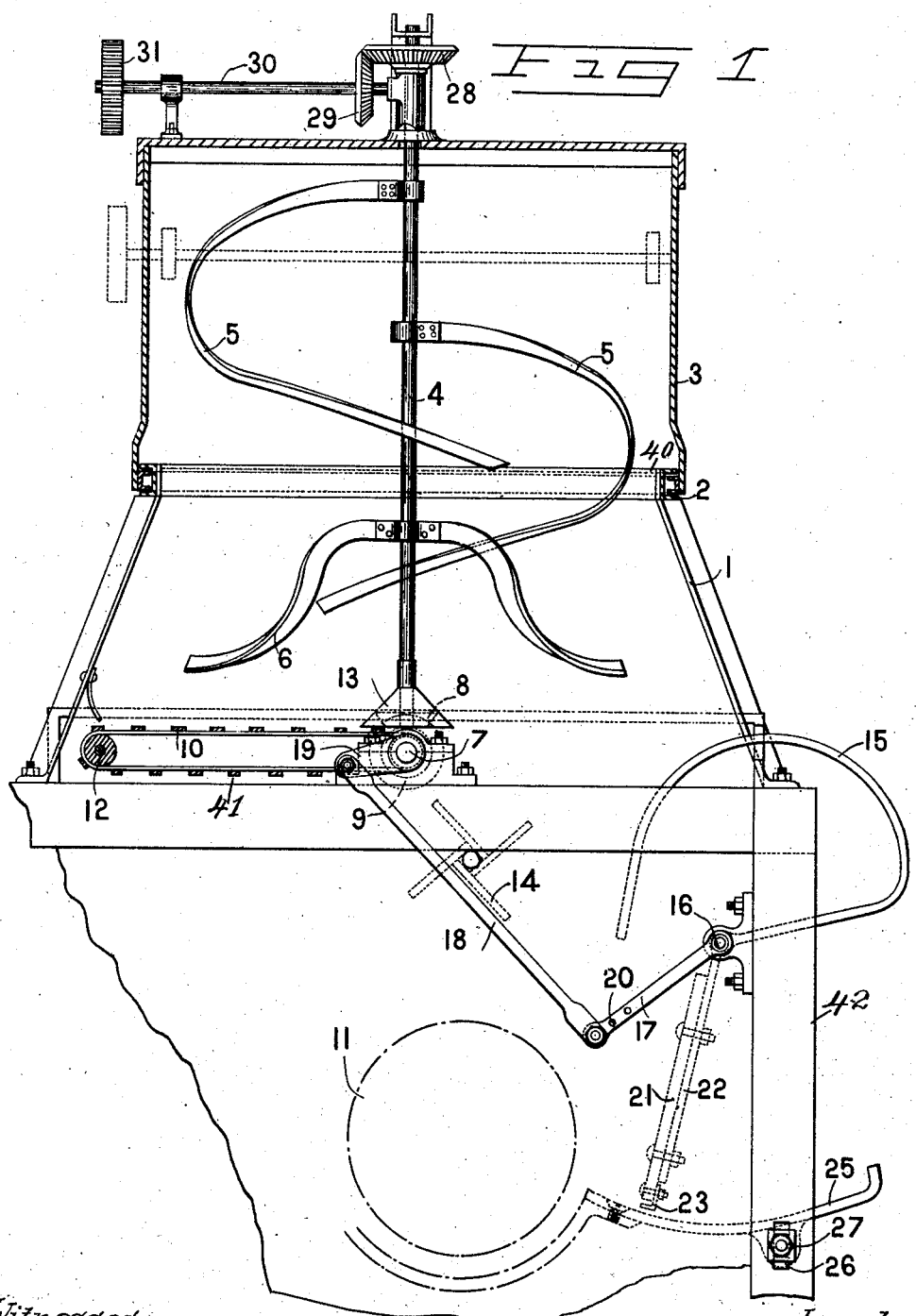

J. GAYRAUD.
FEEDER FOR THRESHING MACHINES.
APPLICATION FILED JAN. 12, 1910.

973,496.

Patented Oct. 25, 1910.
2 SHEETS—SHEET 1.

Witnesses:

Inventor
José Gayraud
by B. Singer
Att'y

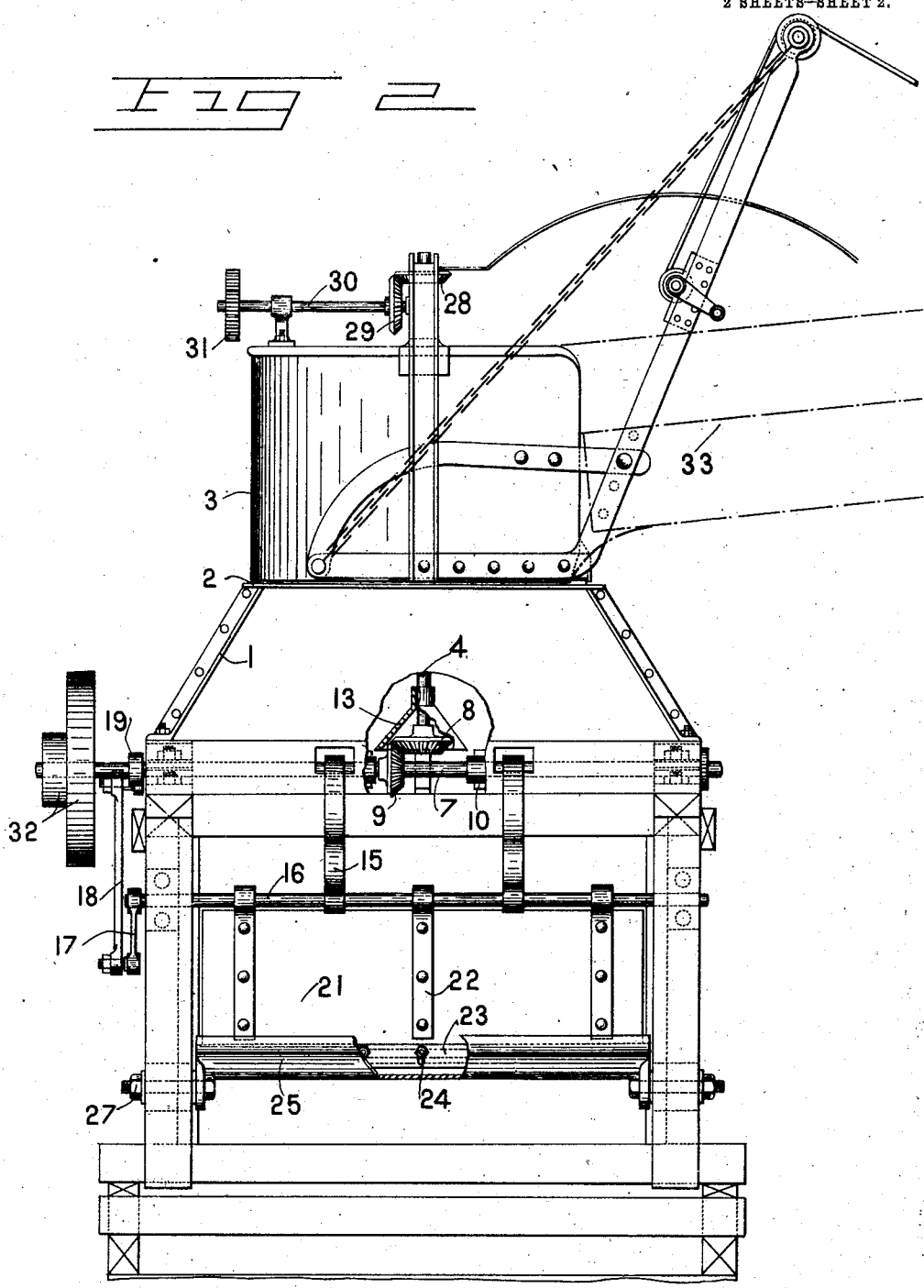

UNITED STATES PATENT OFFICE.

JOSÉ GAYRAUD, OF BUENOS AYRES, ARGENTINA.

FEEDER FOR THRESHING-MACHINES.

973,496.  Specification of Letters Patent.  Patented Oct. 25, 1910.

Application filed January 12, 1910. Serial No. 537,675.

*To all whom it may concern:*

Be it known that I, JOSÉ GAYRAUD, a citizen of France, farmer, residing at 25 de Mayo street, Buenos Ayres, Argentina, have invented a Feeder for Threshing-Machines, of which the following is a specification.

This invention relates to threshing machines and especially to devices designed to feed the stock to the threshing cylinder.

An object of the invention is to provide a feeder, which is adapted to loosen the stock before it is conveyed into the cylinder.

Another object of the invention is to convey the stock after it has been loosened in one direction only toward the threshing cylinder.

Another object of the invention is to connect the feeding means with the loosening means, so that they are actuated simultaneously.

Another object of the invention is to provide a stock support adjacent the feeding means, which stock support may be adjusted with respect to the feeding means.

Other objects will be more fully understood by reference to the following specification, the accompanying drawings and the appended claims.

One preferred embodiment of the invention is shown in the accompanying drawings, but it will be understood that changes in the specific structure may be made within the scope of the claims without departing from the spirit of the invention.

Figure 1 shows a side elevation, partly in section of the feeding device. Fig. 2 is a rear view of the same, certain parts being shown broken away for the sake of better illustration.

A feeding tower 3, mounted on top of the threshing machine proper, is supported by means of inclined uprights 1. The feeding tower preferably is of cylindrical shape and open on its lower end on which it is provided with a preferably inwardly projecting flange 2, adapted to slide within an annular guide 40 angular in cross section, likewise supported on the braces 1. As indicated in Fig. 2 a part of the cylindrical wall of the tower may be cut away so as to allow a conveyer 33 to extend into the tower. A shaft 4 disposed within said tower is provided with a plurality of curved arms, said arms being mounted with one end on said shaft, the other end of said arms being free. As indicated in the drawing, these arms are curved in helical or approximately helical shape, which is preferably adapted to receive the stock from the conveyer 33 and to scatter and loosen the same in its conveyance through the feeding tower. A transverse member 6, fastened intermediate its ends on said shaft, is adapted in its rotation to support the material loosened by the action of the helically bent arms 5 and to whirl said material in the lower part of the feeding tower. The transverse member 6 preferably is of a bent shape and longitudinally twisted, so as to resemble a conveying wing. A shaft 7 to which a pulley 32 on the outside of the machine is attached, serves to transmit a rotary motion to the shaft 4 by means of bevel gears 8 and 9. For the purpose of preventing the spread of the stock in all directions below the transverse whirling member 6 a conveyer 10 is disposed at one side of the shaft 4 and preferably below the same, said conveyer also being driven by the shaft 7. A shaft 12 provided with a pulley, may serve as a supporting point for the conveyer, which conveyer preferably is provided with a plurality of transverse slats 41.

A threshing cylinder 11 as indicated in Fig. 1 is disposed with respect to the shaft 4 and the conveyer 10, so that said conveyer prevents the introduction of stock to the threshing cylinder from the left half of the base of the tower. The conveyer 10 not only is in the path of the stock leading to the threshing cylinder, but it also conveys stock thrown toward the left half of the base by the whirling member 6 toward the center thereof from which through the action of the whirling member it is conveyed into the feeding means.

The feeding means include a plurality of arms 15, each secured to the rock shaft 16, which is journaled in the frame 42 of the thresher and is substantially parallel with the threshing cylinder. The said shaft 16 is at one end provided with a link 17, which link is connected to another link 18, said last named link being fastened to a crank arm 19 on the shaft 7. A plurality of holes 20 are provided in one of the said links, so that by securing these links together by inserting the pin in either one of said holes the swinging motion of the link 17 may be increased or decreased as desired. For the purpose of having the amount of stock conveyed to the oscillating arms 15 more uniform, a rotary beater 14 is disposed between the transverse whirling member 6 and the feeding arms 15.

A wiping member is mounted on shaft 16 and preferably on the opposite sides thereof to the arms 15 and as shown, said wiping member comprises a board 21 mounted longitudinally with respect to said shaft and fastened thereon by means of strips 22, secured at one end to the shaft 16. The lower end of said board may be extended by means of an adjustably secured flange 23 thereon. This flange preferably is of angular form, one leg of the angle being provided with a plurality of slots 24, with fastening screws extending therethrough, so that the angular flange 23 may be shifted toward or from the free edge of the board 21 and may be fastened in any desired position with respect thereto. A preferably curved support 25 is mounted in the frame of the machine and the height of said support with respect to the wiping member 21 may be adjusted by means of nuts 27, engaging bolts which project through slots 26 in the frame of the machine.

A shaft 30 provided with a gear wheel 31 on top of the feeding tower is preferably equipped near its inner end with a bevel gear 29. Said last named bevel gear meshes with a bevel gear 28, mounted near the top of the shaft 4, so that by rotation of said shaft a rotary motion is imparted to the gear 31. By means of driving chains or other driving connections engaging gear wheel 31 but not shown in the drawing, an endless conveyer running within the trough 33 may be driven.

For the purpose of preventing engagement of the stock with the bevel gears 8 and 9 at the base of the feeding tower, a protecting hood 13 is fastened near the lower end of the shaft 4.

The operation of the device is as follows: The stock is supplied to the feeding tower by means of the conveyer 33 and it is loosened and scattered therein by the helical bent arms 5. It may easily be seen that by the feature according to which these arms are provided with free ends, and on account of their peculiar shape they are particularly adapted to obtain a thorough loosening of the stock, simultaneously conveying the same downwardly. A further continued scattering of the stock is obtained by the whirling motion of the transverse member 6, disposed below the helically bent arms. After the stock has been thoroughly loosened, it is conveyed to the threshing cylinder through the oscillating movement of the curved arms 15 which in their swinging movement grasp a certain amount of the stock and convey the same downwardly so that it will drop onto the support 25. The conveyer 10, is arranged at the base of the feeding tower, and prevents the stock from approaching the threshing cylinder in any direction different from the direction in which the feeding means convey the same against the threshing cylinder. The conveyer also contributes to supply the feeding means uniformly with a certain amount of stock. Adjustment of the wiping member 21 is had either by adjusting the stock support by means of the bolts 27 or by lengthening the wiping member extending the flange 23.

I claim:—

1. In a feeder of the class described the combination of a rotatory shaft, a plurality of helically bent arms in superposition mounted with one end on said shaft, a member transversely disposed with respect to said shaft and mounted thereon below said arms, said member being twisted with respect to its longitudinal axis and means for rotating the shaft.

2. In a feeder of the class described the combination with a rotatory shaft, a plurality of helically bent arms mounted with one end on said shaft, a threshing cylinder disposed below said shaft, means for rotating said shaft, a second shaft disposed parallel to said cylinder, a plurality of bent arms mounted with one end on said second shaft and means in coaction with said rotating means for oscillating said second shaft.

3. In a feeder of the class described the combination with a threshing cylinder, of means for conveying stock in one direction to said cylinder, said means including a wiping member disposed parallel to said cylinder and substantially perpendicular with respect to the direction of conveying and means for oscillating said wiping member.

4. In a feeder of the class described the combination with a threshing cylinder, a shaft disposed parallel to said threshing cylinder, a plurality of curved arms mounted with one end on said shaft, a wiping member mounted on said shaft, and means for oscillating said shaft.

5. In a feeder of the class described the combination with a feeding tower, of a rotatory shaft vertically disposed in said feeding tower, a plurality of helically bent arms mounted with one end on said shaft, means for rotating said shaft, a threshing cylinder, a shaft disposed parallel to said threshing cylinder, a plurality of curved arms mounted on said shaft, a wiping member mounted on said shaft and means for oscillating said shaft, said last named means being in coaction with said rotating means.

6. In a feeder of the class described the combination with a feeding tower, of a rotatory shaft vertically disposed in said feeding tower, a plurality of helically bent arms mounted with one end on said shaft, means for rotating said shaft, a threshing cylinder, a conveyer adapted to convey stock inserted in said feeding tower to one side of said threshing cylinder, means in coaction with said rotating means for driving said conveyer, a shaft disposed parallel to said threshing cylinder, a plurality of curved arms mounted with one end on said shaft, a board mounted on said shaft and means for oscillating said shaft, said oscillating means being in coaction with said rotating means.

7. In a feeder the combination with a threshing cylinder, a shaft disposed parallel to said cylinder, a wiping member mounted on said shaft longitudinally with respect thereto, means for changing the width of said member and means for oscillating said shaft.

8. In a feeder the combination with a threshing cylinder, a shaft disposed parallel to said cylinder, a wiping member mounted on said shaft longitudinally with respect thereto, an angular flange adjustably mounted at the free end of said member and means for oscillating said shaft.

9. In a feeder the combination with a threshing cylinder, a shaft disposed parallel to said cylinder, a wiping member mounted on said shaft longitudinally with respect thereto, a support for the stock in opposition to said wiping member, means for adjusting the height of said support with respect to said wiping member, and means for oscillating said shaft.

10. In a feeder the combination of a feeding tower, a shaft vertically disposed therein, a plurality of helically bent arms mounted with one end on said shaft, means for rotating said shaft, a threshing cylinder, a second shaft disposed parallel to said cylinder, a board mounted on said second shaft, a stock support in opposition to said board, means for adjusting the height of said support with respect to said board, a plurality of curved arms mounted on said second shaft, and means in coaction with said rotating means for oscillating said second shaft.

11. In a feeder the combination of a rotatable feeding tower, a shaft vertically disposed therein, a plurality of helically bent arms mounted with one end on said shaft, a member transversely disposed with respect to said shaft and mounted thereon intermediate its ends below said arms, said member being twisted longitudinally, a threshing cylinder below said tower, a conveyer intermediate said shaft and said threshing cylinder, said conveyer being adapted to convey stock from said feeding tower to one side of said cylinder, driving means for said conveyer in coaction with said rotating means, a second shaft disposed parallel to said cylinder, a plurality of curved arms mounted with one end on said shaft, a board mounted on said shaft in opposition to said arms, means for oscillating said shaft in coaction with said rotating means, a flange adjustably secured to said board on the free edge thereof, a stock support in opposition to said flange, and means for adjusting the height of said support with respect to said flange.

In testimony whereof I affix my signature in presence of two witnesses.

JOSÉ GAYRAUD.

Witnesses:
 JOSE Y. GALLARDO,
 JOSÉ ROBLES.